(12) United States Patent
Spaulding et al.

(10) Patent No.: US 9,335,797 B1
(45) Date of Patent: May 10, 2016

(54) SUPPORTING COMPUTER BOARDS

(71) Applicant: Google Inc., Mountain View, CA (US)

(72) Inventors: Jeffrey S. Spaulding, Sunnyvale, CA (US); Winnie Leung, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 14/267,098

(22) Filed: May 1, 2014

(51) Int. Cl.
*H05K 1/14* (2006.01)
*G06F 1/18* (2006.01)

(52) U.S. Cl.
CPC ........................................ *G06F 1/185* (2013.01)

(58) Field of Classification Search
USPC ................ 361/736, 807, 809, 810, 800, 792; 439/55, 65, 79, 91, 92, 567, 625, 626, 439/660, 701
See application file for complete search history.

(56) References Cited

U.S. PATENT DOCUMENTS

| | | | | |
|---|---|---|---|---|
| 4,579,406 A | * | 4/1986 | Laursen et al. | 439/62 |
| 4,664,458 A | * | 5/1987 | Worth | 439/82 |
| 5,872,701 A | * | 2/1999 | Hayden et al. | 361/786 |
| 6,356,454 B1 | * | 3/2002 | Braunlich et al. | 361/784 |
| 6,371,802 B1 | * | 4/2002 | Smalley et al. | 439/567 |
| 6,381,149 B1 | * | 4/2002 | Megason et al. | 361/801 |
| 6,816,388 B2 | * | 11/2004 | Junkins et al. | 361/801 |
| 7,002,796 B2 | * | 2/2006 | Lao et al. | 361/695 |
| 2002/0030974 A1 | | 3/2002 | Higashida | |
| 2002/0031953 A1 | | 3/2002 | Hashimoto | |
| 2002/0072263 A1 | | 6/2002 | Fumikura | |
| 2004/0121636 A1 | | 6/2004 | Lai | |
| 2006/0105605 A1 | | 5/2006 | Liao | |
| 2006/0128189 A1 | | 6/2006 | Kuo | |
| 2008/0268688 A1 | | 10/2008 | Fumikura | |
| 2009/0142944 A1 | | 6/2009 | Zhu | |
| 2009/0298305 A1 | | 12/2009 | Wu | |
| 2011/0034055 A1 | | 2/2011 | Yao | |

* cited by examiner

*Primary Examiner* — Hung S Bui
(74) *Attorney, Agent, or Firm* — Fish & Richardson P.C.

(57) ABSTRACT

A printed circuit board (PCB) support system includes a guide attachable to a housing of a computing assembly that includes a motherboard and a daughterboard, the guide including a locking assembly that includes a notch and a surface angled toward the notch and is biased to snap over a portion of a side edge of the daughterboard received into the notch; and a PCB support attachable to a surface of the motherboard, the PCB support including a cleft sized to support a bottom edge of the daughterboard.

30 Claims, 5 Drawing Sheets

SUPPORTING COMPUTER BOARDS

TECHNICAL FIELD

This disclosure describes techniques for removably attaching circuit cards or daughterboards to a mother board or other printed circuit devices.

BACKGROUND

Generally, a computer architecture includes mother boards that serve as a communication medium for the exchange of electronic signals between a plurality of daughterboards. Circuitry on each daughterboard can generate communication signals, which are distributed to connectors mounted along an edge of the daughter card. Daughterboard connectors mate with a corresponding set of backplane connectors, typically arranged in equidistant rows on the backplane for providing interconnection and distribution of signals between them.

The position of a daughterboard on the mother board can be fixed by a card guide. For vertical placement, the card guides are elongated components that can be removably attached to two opposing sides of the daughterboard. Generally, card guides may require 0.1" (2.5 mm) by 0.2" (5 mm) area along both sides of the daughterboard to be clear of traces and components. This requirement can impose particular limitations that can make such a card guide incompatible within the modern tendency of decreasing the size of electronic components.

SUMMARY

This disclosure describes systems and methods that may be employed to provide support to daughterboards. In an example implementation, a printed circuit board (PCB) support system includes a guide attachable to a housing of a computing assembly that includes a motherboard and a daughterboard, the guide including a locking assembly that includes a notch and a surface angled toward the notch and is biased to snap over a portion of a side edge of the daughterboard received into the notch and a PCB support attachable to a surface of the motherboard, the PCB support including a cleft sized to support a bottom edge of the daughterboard.

In a first aspect combinable with the general implementation, the locking assembly further includes a rib coupled to the surface angled towards the notch from a side edge of the guide.

In a second aspect combinable with any of the previous aspects, the rib includes a first rib, and the guide further includes a second rib coupled to the surface angled towards the notch from a side edge of the guide in parallel with the first rib.

In a third aspect combinable with any of the previous aspects, the notch is sized to engage only the portion of the side edge of the daughterboard near a corner of the daughterboard that includes an intersection of the side edge and a top edge of the daughterboard.

In a fourth aspect combinable with any of the previous aspects, the locking assembly includes a first locking assembly, the rib includes a first rib, and the notch includes a first notch.

In a fifth aspect combinable with any of the previous aspects, the guide further includes a second locking assembly that includes a second notch that is sized to engage a portion of a side edge of a second daughterboard and a second rib that ramps from the surface of the guide up to the second locking assembly.

In a sixth aspect combinable with any of the previous aspects, the guide further includes a stop formed on the surface of the guide, the stop including a first side surface positioned to support the first daughterboard and a second side surface positioned to support the second daughterboard.

In a seventh aspect combinable with any of the previous aspects, the notch substantially secures, at least in part, the daughterboard against rotational movement.

In another example general implementation, a method includes positioning a bottom edge of a daughterboard near a connection of a motherboard of a computing assembly at least partially enclosed in a housing, rotating the daughterboard about a pivot while a portion of a side edge of the daughterboard is contactingly engaged with a rib of a guide assembly that ramps from a surface of the guide assembly up to a lock assembly, the guide assembly attached to the housing, snapping the portion of the side edge of the daughterboard into the lock assembly, the lock assembly including a notch that is sized to secure the portion of the side edge of the daughterboard, inserting a portion of the bottom edge of the daughterboard into the connection, and inserting a portion of the bottom edge of the daughterboard into a support assembly attached to the motherboard.

In a first aspect combinable with the general implementation, inserting the bottom edge of the daughterboard into a support assembly attached to the motherboard includes inserting the bottom edge of the daughterboard into a cleft sized to support the bottom edge of the daughterboard.

A second aspect combinable with any of the previous aspects further includes resisting rotation of the daughterboard about a first axis by the lock assembly and resisting rotation of the daughterboard about a second axis by the support assembly.

A third aspect combinable with any of the previous aspects further includes positioning a bottom edge of a second daughterboard near a second connection of the motherboard, rotating the second daughterboard about a pivot while a portion of a side edge of the second daughterboard is contactingly engaged with a second rib of the guide assembly that ramps from the surface of the guide assembly up to a second lock assembly, snapping the portion of the side edge of the second daughterboard into the second lock assembly, the second lock assembly including a second notch that is sized to secure the portion of the side edge of the second daughterboard, inserting a portion of the bottom edge of the second daughterboard into the second connection, and inserting another portion of the bottom edge of the second daughterboard into a second support assembly attached to the motherboard.

In a fourth aspect combinable with any of the previous aspects, the connection includes a Peripheral Component Interconnect Express (PCIe) connection.

In a fifth aspect combinable with any of the previous aspects, the notch is sized to engage only a portion of the side edge of the daughterboard near a corner of the daughterboard that includes an intersection of the side edge and a top edge of the daughterboard.

In another example general implementation, a system includes a computing assembly including an enclosure and a PCB assembly at least partially enclosed in the enclosure, and a PCB support assembly. The PCB assembly includes a first PCB and a second PCB. The PCB support assembly includes a guide assembly attachable to a rail of the enclosure, the guide assembly including an angled rail that extends from a surface of the guide assembly up to a trough that is sized to engage a portion of a side edge of the second PCB, and a support attachable to a surface of the first PCB, the PCB support including a cleft sized to support a bottom edge of the second PCB.

In a first aspect combinable with the general implementation, the trough is sized to engage only a portion of the side edge of the second PCB near a corner of the second PCB that includes an intersection of the side edge and a top edge of the second PCB.

In a second aspect combinable with any of the previous aspects, the angled rail includes a first angled rail, and the guide assembly further includes a second angled rail that extends from the surface of the guide assembly up to the trough in parallel with the first angled rail.

In a third aspect combinable with any of the previous aspects, the guide assembly further includes a stop formed on the surface of the guide assembly and positioned to support a surface of the second PCB engaged in the trough.

In a fourth aspect combinable with any of the previous aspects, the trough includes a first trough and the angled rail includes a first angled rail.

In a fifth aspect combinable with any of the previous aspects, the guide assembly further includes a second trough that is sized to engage a portion of a side edge of a third PCB, and a second angled rail that extends from the surface of the guide up to the second trough.

In a sixth aspect combinable with any of the previous aspects, the stop is positioned to support the surface of the second PCB and a surface of the third PCB.

In a seventh aspect combinable with any of the previous aspects, the trough substantially secures, at least in part, the second PCB against rotational movement.

In another example general implementation, a printed circuit board (PCB) support system includes a housing of a computing assembly that comprises a motherboard and a daughterboard, and a PCB support attachable to a surface of the motherboard, the PCB support comprising: a cleft sized to support a bottom edge of the daughterboard, and a protrusion that couples to the motherboard.

In a first aspect combinable with the general implementation, the protrusion comprises a split stud that snaps into an aperture of the motherboard.

In a second aspect combinable with any of the previous aspects, the split stud includes a detent that at least partially engages an underside of the motherboard.

A third aspect combinable with any of the previous aspects further includes a sloped surface rising from a side of the cleft.

In a fourth aspect combinable with any of the previous aspects, the sloped surface includes a support surface for the daughterboard during insertion of the bottom edge of the daughterboard into the cleft.

In a fifth aspect combinable with any of the previous aspects, the daughterboard is pivotably inserted into the cleft.

A sixth aspect combinable with any of the previous aspects further includes sloped surfaces rising from sides of the cleft, the sloped surfaces including support surfaces for the daughterboard during insertion of the bottom edge of the daughterboard into the cleft.

The details of one or more embodiments are set forth in the accompanying drawings and the description below. Other features, objects, and advantages will be apparent from the description and drawings, and from the claims.

DETAILED DESCRIPTION

Figure 1A:
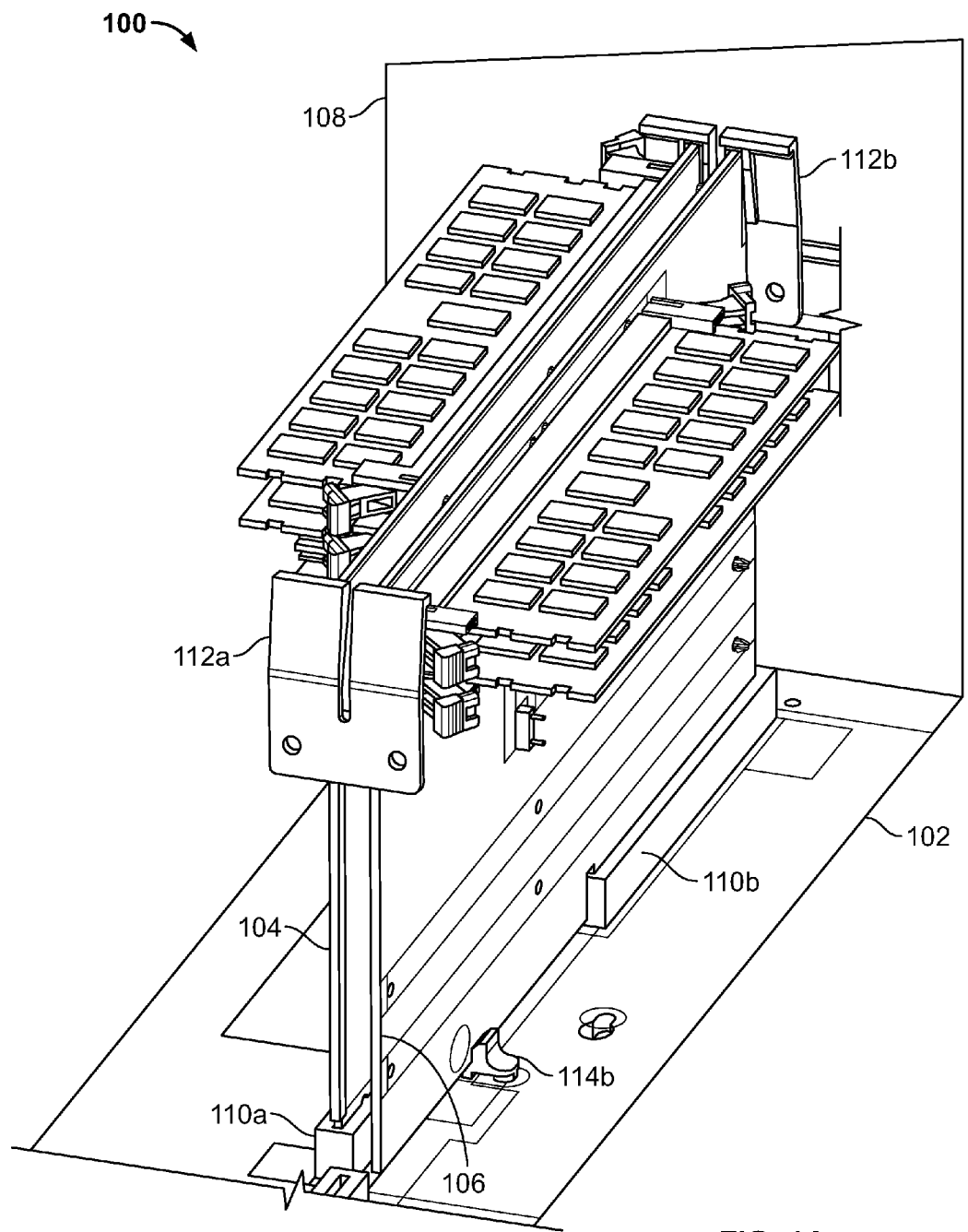
FIG. 1A shows a perspective view of an example printed circuit board (PCB) support system including a plurality of daughterboards.
Figure 1B:
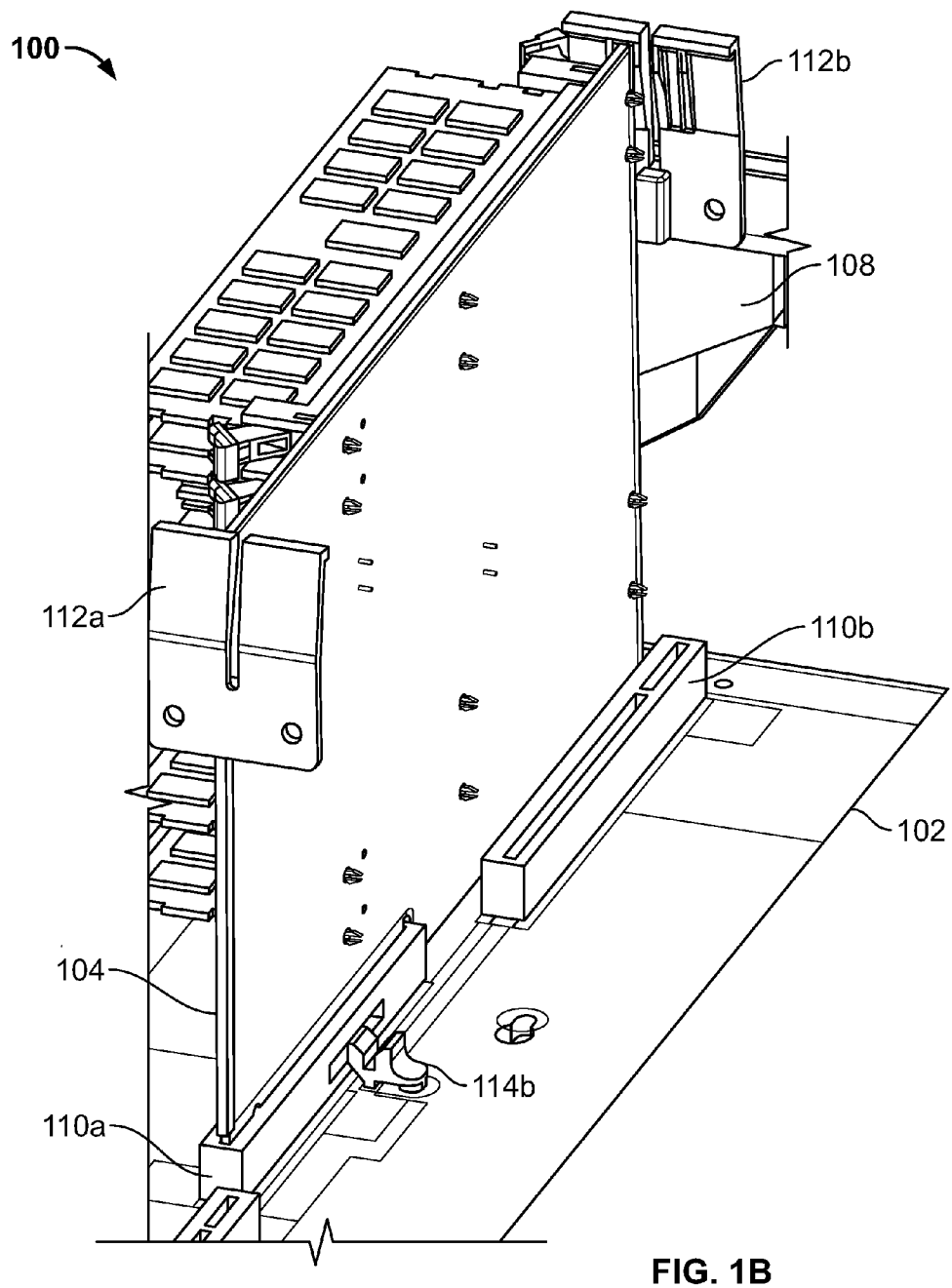
FIG. 1B shows a perspective view of an example PCB support system including a single daughterboard.
Figure 1C:
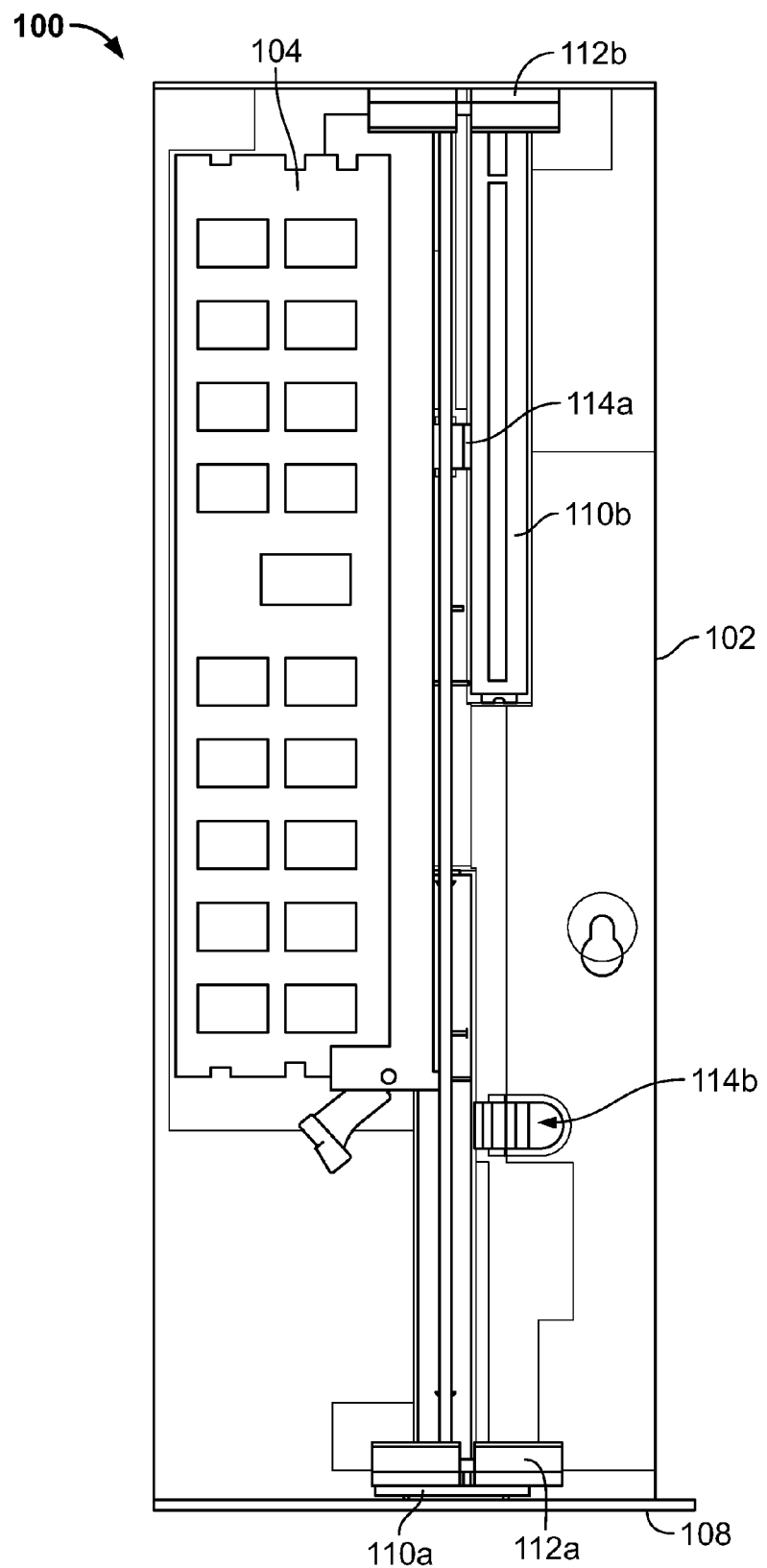
FIG. 1C shows a top view of an example PCB support system.

FIGS. 1A, 1B and 1C illustrate a printed circuit board (PCB) support system 100 formed in accordance with an example embodiment of the present invention. In some implementations, PCB support system 100 can be formed to safely transport a variety of components. In other implementations, PCB support system 100 can include a variety of components needed to operate a more general computer system or a portion of a computing assembly. The computing assembly can include a wide range of computing components, and is not limited to traditional PC's, mainframes, or other such computers. In addition, a device may be considered a computer even if it does not have a full complement of input/output components such as a monitor, keyboard, or other such items.

In some examples, as illustrated in FIG. 1A, PCB support system 100 can include a motherboard 102, a first daughterboard 104, a second daughterboard 106, a housing 108 of the computing assembly, connectors 110a and 110b, guides 112a and 112b and PCB supports 114a and 114b. In other examples, as illustrated in FIGS. 1B and 1C, PCB support system 100 can include a motherboard 102 and a single daughterboard 104, a housing 108 of the computing assembly, connector 110a, guides 112a and 112b and a PCB support 114a. The motherboard 102 can include one or more spacers, to separate the attached daughterboards (e.g. first daughterboard 104 and second daughterboard 106), a microprocessor, a chipset, a memory, a network connector, and a fixed disk drive.

The motherboard 102 in PCB support system 100 can also include other processing devices (e.g., CPUs, MMUs, ASICs, FPGAs, and DSPs), memory (e.g., single in-line memory modules (SIMM) and dual in-line memory modules (DIMM), flash memory, etc.), mass storage interfaces (e.g., USB), serial and parallel ports, expansion slots, and controllers required to control standard peripheral devices, such as a display screen, keyboard, and disk drive. Alternatively, particular components can be omitted where they are not necessary to the operation of circuit board assembly 100, or may be included on other boards or other portions of a larger system, such as in a datacenter. In some examples, PCB support system 100 can be dedicated to processing, while in other examples, PCB support system 100 can be dedicated to mass storage.

The motherboard 102 can include a controlling circuit board in a computing device that can electrically connect attached components (e.g., memory, processors, and peripheral devices) to each other directly, or over one or more connectors 110a and 110b. In some implementations, connectors 110a and 110b can be feed-through connectors that electrically connect circuits on the first daughterboard 104 to circuits on the second daughterboard 106. For example, connectors 110a and 110b can include a peripheral component interconnect express (PCIe), a peripheral component interconnect (PCI), a peripheral component interconnect extended (PCI-X) accelerated graphics port (AGP) bus standards or any other types of bus standards compatible with the motherboard 102 and the daughterboards 104 and 106. The motherboard 102 can also include electrical modules that can be connected to one or both of the daughterboards 104 and 106.

In some implementations, as shown in FIGS. 1A and 1B, the daughterboards 104 and 106 can be attached to a side (e.g., top side) of the motherboard 102. The daughterboards 104 and 106 and other components can also be attached to a different side (e.g., bottom side) or both sides of the motherboard 102. The daughterboards 104 and 106 can include connectors (not shown) that electrically mate with connectors (not shown) on the connections 110a and 110b, respectively that are attached to the motherboard 102.

The daughterboards 104 and 106 can be mounted in a vertical position on the motherboard 102. The first and second daughterboards 104 and 106 can be removably locked in position by a pair of guides 112a and 112b. Each of the guides 112a and 112b is attachable to the housing 108 of the computing assembly that includes the motherboard 102 and the daughterboards 104 and 106. Each of the guides 112a and 112b receive one of the two opposing free edges of a daughterboard 104 or 106. In some implementations, as illustrated in FIGS. 1A and 1B, the pair of guides 112a and 112b can support a plurality of daughterboards 104 and 106 (e.g. two or more daughterboards). In some implementations, a pair of guides 112a and 112b support a single daughterboard (e.g., daughterboard 104). In some implementations, the guides 112a and 112b can prevent the rotation of the attached daughterboards about a vertical axis. The guides 112a and 112b are further described with reference to FIG. 2.

The first daughterboard 104 can be supported in the vertical position by a PCB support 114a attachable to a surface of the motherboard 102 (shown in FIG. 1C). The second daughterboard 106 can be supported in the vertical position by a PCB support 114b attachable to a surface of the motherboard 102 (shown in FIGS. 1A, 1B and 1C). In some implementations, the PCB supports 114a and 114b can prevent the rotation of the attached daughterboards about an axis by the support assembly. Each of the PCB supports 114a and 114b can cooperate with the pair of guides 112a and 112b to lock the inserted daughterboard 104 and 106, respectively, in position. The motherboard 102 can include one or more available PCB supports and connectors to enable the attachment and support of additional daughterboards (as shown in FIG. 1B).

Advantageously, the described system may provide for one or more features, such as decreasing the contact surface of the daughterboard required for support. Specifically, the PCB support system 100 provides support on a fraction of the side edges of the daughterboard and a small fraction of the bottom edge of the daughterboard, which is different from some traditional support systems that require full length support on the side and the top edge of the daughterboard. Additionally, decreasing the contact surface of the daughterboard can enable the expansion of the functional area of the daughterboard.

Figure 2:
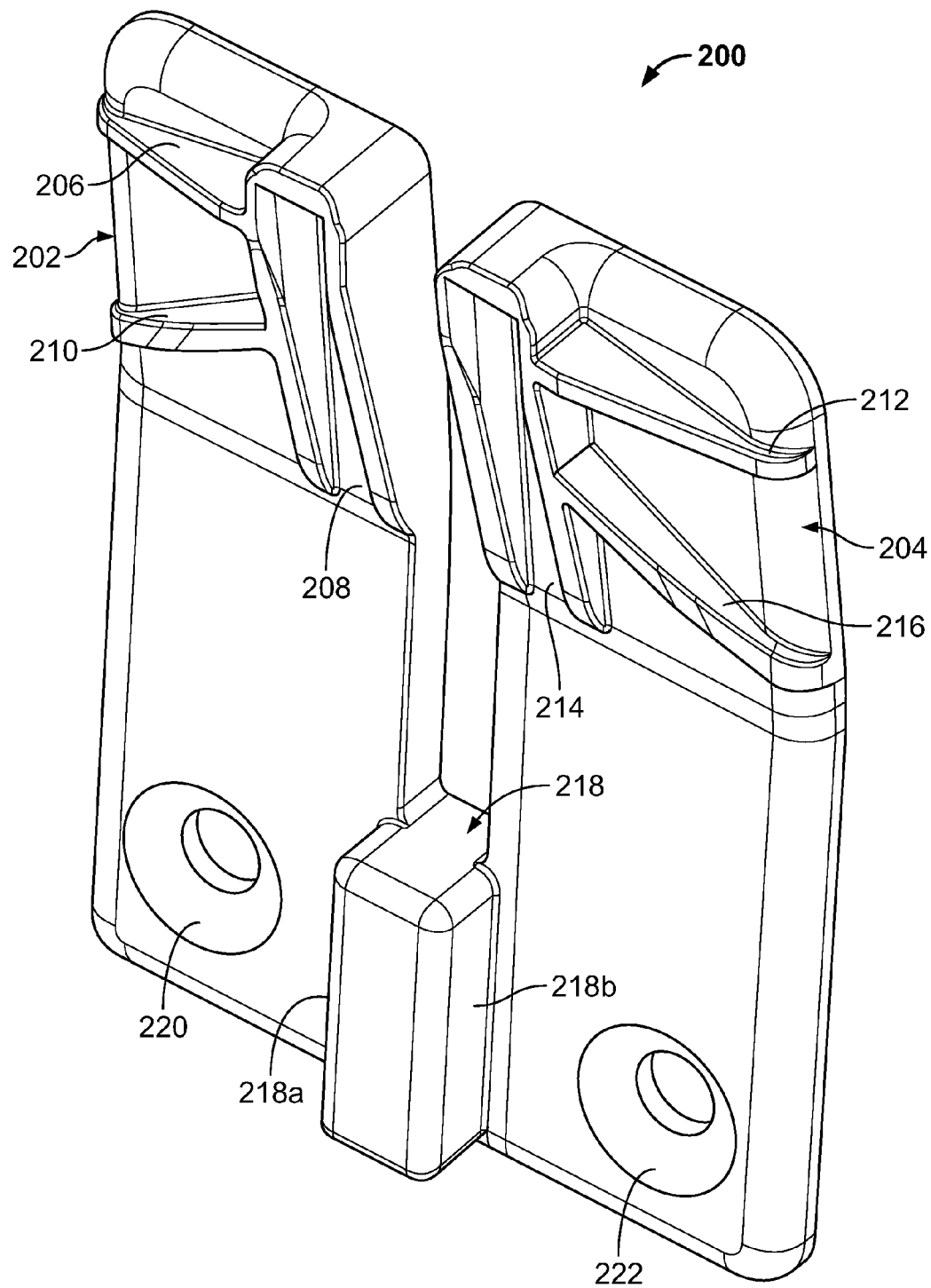
FIG. 2 shows a perspective view of a guide for back-to-back board mounting.

FIG. 2 shows a perspective view of an example guide 200 for daughterboards mounting. In general, the guide 200 can be manufactured from a material presenting high durability, to prevent deformation due to prolonged support of daughterboards. For example, the guide 200 can be a glass filled nylon or other material as appropriate. The guide 200 can be configured to support one or more daughterboards. In the illustrated example of FIG. 2, the guide 200 includes a pair of locking assemblies 202 and 204 for back-to-back mounting of two daughterboards. The locking assemblies 202 and 204, as shown, may be biased to flex inwardly (e.g., bent) so that they bias forward to engage the top edge of the daughter board when the daughter board is fully received into the notches 208 and/or 214. Thus, during installation of the daughterboard into the guide 200, the locking assemblies 202 and/or 204 may be pushed outwardly (e.g., opposite of the inward bent as shown) and then snap over the daughterboard, forming a removable attachment.

The first locking assembly 202 includes a first rib 206, a notch 208 and a second rib 210. The second locking assembly 204 includes a first rib 212, a notch 214 and a second rib 216. The first ribs 206 and 212 ramp up from the surface of the guide 200, having a maximum width near to the corresponding notch 208 and 214, respectively. The first ribs 206 and 212 can guide the side edge of a daughterboard during the installation in the corresponding locking assemblies 202 and 204, respectively.

Each of the notches 208 and 214 can be sized to engage a portion of a side edge of the daughterboard. The notches 208 and 214, in some implementations, are sized to engage only the portion of the side edge of the daughterboard near a corner of the daughterboard that includes an intersection of the side edge and a top edge of the daughterboard, rather than, for instance, a whole side edge of the daughterboard. For example, the notches 208 and 214 can have a constant width of 1-3 mm, a depth of 1-2 mm and a length of 1-5 cm. In some implementations, the notches 208 and 214 can be parallel to each other. In other implementations, the notches 208 and 214 can be symmetrically arranged relative to the vertical axis of the guide 200. The notches 208 and 214 can substantially secure, at least in part, the daughterboard against rotational movement.

The second ribs 210 and 216 ramp up from the surface of the guide 200, having a maximum width near to the corresponding notch 208 and 214, respectively. The maximum width of the first and second ribs 206, 212, 210, and 216 can be equal to the depth of the notches 208 and 214. In some implementations, the second ribs 210 and 216 are parallel to the first ribs 206 and 212, respectively. In other implementations, the second ribs 210 and 216 are diverging away from the first ribs 206 and 212, respectively, having the widest inter-distance at the outer edges of the guide 200 and the narrowest inter-distance proximal to the corresponding notch 208 and 214, respectively. The width of the narrowest inter-distance is equal or larger than the width of the corresponding notch 208 or 214. The divergent arrangement of the second ribs 210 and 216 relative to the first ribs 206 and 212 can allow the daughterboard to rotate while it is removed.

In some implementations, the guide 200 includes a stop 218. The stop 218 can be formed on the surface of the guide 200 and have side surfaces 218a and 218b positioned to support a surface of the daughterboard engaged in a notch 208 or 214. The stop 218 can be positioned to support the surface of the first daughterboard and a surface of the second daughterboard until the lock engages the daughterboard and pulls it away. In some implementations, the guide 200 includes one or more fastening features configured to enable the attachment of the guide 200 to the housing of the PCB support system. In the illustrated example, the guide 200 includes two contours defining the through-holes 220 and 222. The guide 200 can be attached to the housing of the PCB support system by using rivets fitting in the through-holes 220 and 222.

Figure 3:
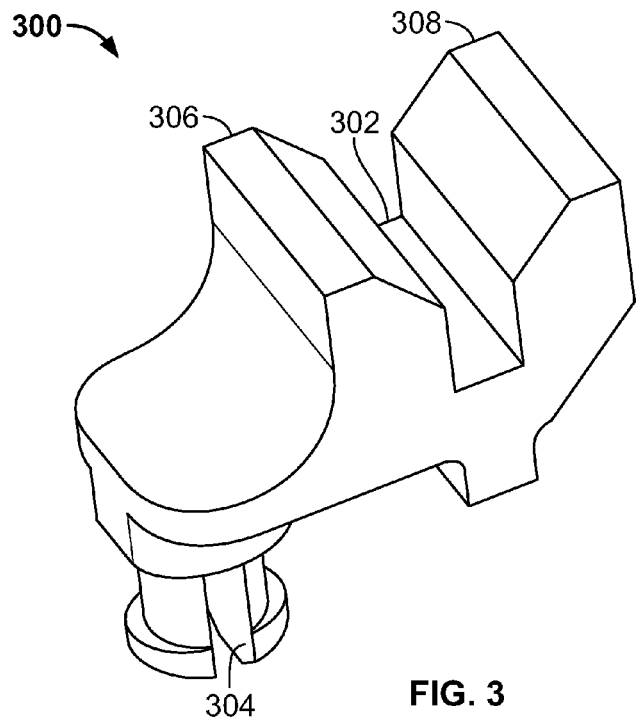
FIG. 3 shows a perspective view of a PCB support.

FIG. 3 shows a perspective view of a PCB support 300, attachable to a surface of the motherboard to support a daughterboard, as described with reference to FIG. 1. In general, the PCB support 300 can be configured to enable the daughterboard to snap into a locked position, providing stability during handling and operation. In some implementations, the PCB support 300 can be manufactured from molded plastic.

As illustrated in FIG. 3, the PCB support 300 includes a cleft 302 and a fastening part 304. The cleft 302 is sized to support a bottom edge of the daughterboard. For example, the cleft 302 can have a constant width of 1-3 mm and a length of 1-2 cm. The cleft walls 306 and 308 can be configured to minimize the keep-out distance. In some implementations, the walls of the cleft 306 and 308 can have a thickness that is less than the thickness of a connector's walls. For example, the thickness of the cleft walls 306 and 308 can be between 5 and 10 mm. The upper part of the inner sides of the cleft walls 306 and 308 can be angled to guide (e.g., pivotably) the motherboard into the cleft 302 during installation. The lower part of the inner sides of the cleft walls 306 and 308 can be vertical to prevent the daughterboard from being accidentally detached after being locked in position.

The fastening part 304 can be a protruding shaft that extends from the bottom surface of the PCB support 300 that includes a smaller diameter shaft and larger diameter detent portion that can engage a motherboard (e.g., an underside surface of the motherboard). The fastening part 304 can require a hole in the motherboard for enabling the attachment. The diameter of the fastening part 304 can be selected to minimize the area of the motherboard required for attachment. For example, the diameter of the fastening part 304 (e.g., the shaft) can be between 5 and 12 mm. The fastening part 304 can include an internal or external profile (e.g., part of or all of the detent) for strengthening the attachment of the PCB support 300 to a motherboard with a rivet, a washer or other matching components.

Figure 4:
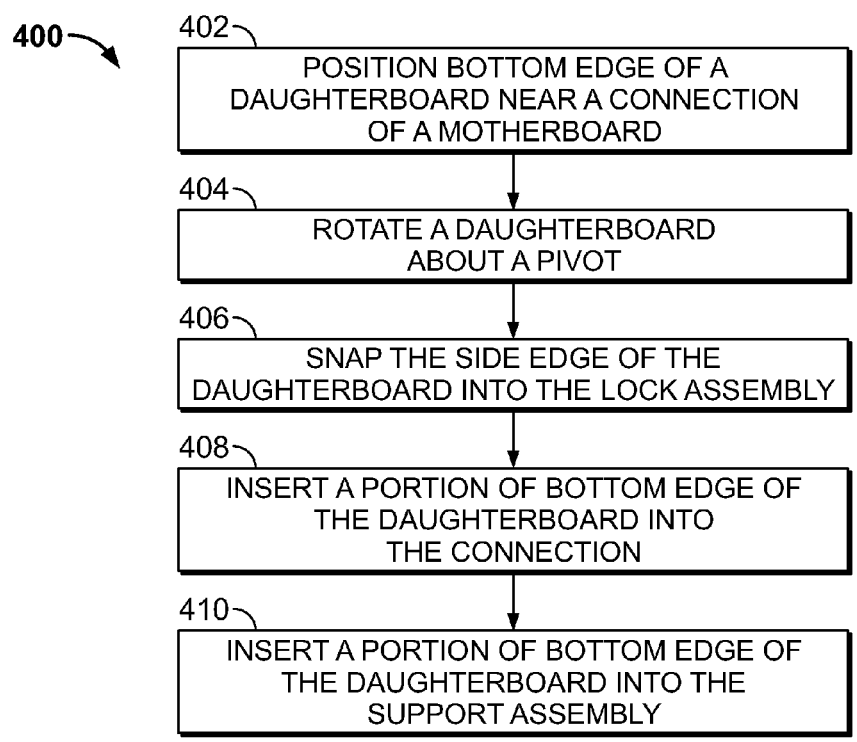
FIG. 4 is a flow chart of an example process of connecting a daughterboard to a motherboard.

FIG. 4 is a flow chart of a process 400 for attaching a daughterboard to a mother board using the systems described with reference to FIGS. 1A, 1B, 1C, 2, and 3. In step 402, a bottom edge of a daughterboard can be positioned near to a connection of a motherboard of a computing assembly that is at least partially enclosed in housing. In step 404, the daughterboard can be rotated about a pivot. During the rotation, a portion of a side edge of the daughterboard is contactingly engaged with a rib of a guide assembly that ramps from a surface of the guide assembly up to a lock assembly, the guide assembly being attached to the housing.

In step 406, the portion of the side edge of the daughterboard can be snapped into the lock assembly. The lock assembly can include a notch that is sized to secure the portion of the side edge of the daughterboard. In step 408, the portion of the bottom edge of the daughterboard can be inserted into the connection. In step 410, the portion of the bottom edge of the daughterboard can be inserted into a support assembly attached to the motherboard. The insertion of the bottom edge of the daughterboard into a support assembly attached to the motherboard can include inserting the bottom edge of the daughterboard into a cleft sized to support the bottom edge of the daughterboard.

In some implementations, the process 400 can be repeated for installing an additional daughterboard, the number of times, the process 400 can be repeated depends on the number of lock assemblies available in the guide. For example, for the guide illustrated in FIG. 2, the process 400 can be repeated twice. During the repetition, in step 412, a bottom edge of a second daughterboard can be positioned near to a second connection of the motherboard. In step 414, the second daughterboard can be rotated about a pivot while a portion of a side edge of the second daughterboard is contactingly engaged with a second rib of the guide assembly that ramps from the surface of the guide assembly up to a second lock assembly. In step 416, the portion of the side edge of the second daughterboard can be snapped into the second lock assembly, the second lock assembly including a second notch that is sized to secure the portion of the side edge of the second daughterboard. In step 418, a portion of the bottom edge of the second daughterboard can be inserted into the second connection. In step 420, another portion of the bottom edge of the second daughterboard can be inserted into a second support assembly attached to the motherboard.

A number of embodiments have been described. Nevertheless, it will be understood that various modifications may be made. For example, various forms of the flows shown above may be used, with steps re-ordered, added, or removed. Also, although several applications of the daughterboards connection systems and methods have been described, it should be recognized that numerous other applications are contemplated. Moreover, although many of the embodiments have been described in relation to particular geometric arrangements of connectors, various other arrangements may also be used. Accordingly, other embodiments are within the scope of the following claims.

What is claimed is:

1. A printed circuit board (PCB) support system, comprising:
    a guide attachable to a housing of a computing assembly that comprises a motherboard and a daughterboard, the guide comprising a locking assembly that comprises a notch to receive a side edge of the daughterboard and a surface angled toward the notch, the locking assembly biased to snap over a portion of the side edge of the daughterboard pivotally received across the surface and into the notch; and
    a PCB support attachable to a surface of the motherboard, the PCB support comprising a cleft sized to support a bottom edge of the daughterboard.

2. The PCB support system of claim 1, wherein the locking assembly further comprises a rib coupled to the surface angled towards the notch from a side edge of the guide.

3. The PCB support system of claim 2, wherein the rib comprises a first rib, and the guide further comprises a second rib coupled to the surface angled towards the notch from a side edge of the guide in parallel with the first rib.

4. The PCB support system of claim 2, wherein the locking assembly comprises a first locking assembly, the rib comprises a first rib, and the notch comprises a first notch, the guide further comprising:
    a second locking assembly that comprises a second notch that is sized to engage a portion of a side edge of a second daughterboard; and
    a second rib that ramps from the surface of the guide up to the second locking assembly.

5. The PCB support system of claim 4, wherein the guide further comprises a stop formed on the surface of the guide, the stop comprising a first side surface positioned to support the daughterboard and a second side surface positioned to support the second daughterboard.

6. The PCB support system of claim 1, wherein the notch is sized to engage only the portion of the side edge of the daughterboard near a corner of the daughterboard that comprises an intersection of the side edge and a top edge of the daughterboard.

7. The PCB support system of claim 1, wherein the notch substantially secures, at least in part, the daughterboard against rotational movement.

8. A method, comprising:
    positioning a bottom edge of a daughterboard near a connection of a motherboard of a computing assembly at least partially enclosed in a housing;
    rotating the daughterboard about a pivot while a portion of a side edge of the daughterboard is contactingly engaged with a rib of a guide assembly that ramps from a surface of the guide assembly up to a lock assembly, the guide assembly attached to the housing;
snapping the portion of the side edge of the daughterboard into the lock assembly, the lock assembly comprising a notch that is sized to secure the portion of the side edge of the daughterboard;
inserting a portion of the bottom edge of the daughterboard into the connection; and
inserting a portion of the bottom edge of the daughterboard into a support assembly attached to the motherboard.

9. The method of claim 8, wherein inserting the bottom edge of the daughterboard into a support assembly attached to the motherboard comprises inserting the bottom edge of the daughterboard into a cleft sized to support the bottom edge of the daughterboard.

10. The method of claim 8, further comprising:
resisting rotation of the daughterboard about a first axis by the lock assembly; and
resisting rotation of the daughterboard about a second axis by the support assembly.

11. The method of claim 8, further comprising:
positioning a bottom edge of a second daughterboard near a second connection of the motherboard;
rotating the second daughterboard about a pivot while a portion of a side edge of the second daughterboard is contactingly engaged with a second rib of the guide assembly that ramps from the surface of the guide assembly up to a second lock assembly;
snapping the portion of the side edge of the second daughterboard into the second lock assembly, the second lock assembly comprising a second notch that is sized to secure the portion of the side edge of the second daughterboard;
inserting a portion of the bottom edge of the second daughterboard into the second connection; and
inserting another portion of the bottom edge of the second daughterboard into a second support assembly attached to the motherboard.

12. The method of claim 8, wherein the connection comprises a Peripheral Component Interconnect Express (PCIe) connection.

13. The method of claim 8, wherein the notch is sized to engage only a portion of the side edge of the daughterboard near a corner of the daughterboard that comprises an intersection of the side edge and a top edge of the daughterboard.

14. A system, comprising:
a computing assembly comprising an enclosure and a printed circuit board (PCB) assembly at least partially enclosed in the enclosure, the PCB assembly comprising a first PCB and a second PCB;
a PCB support assembly, comprising:
a guide assembly attachable to a rail of the enclosure, the guide assembly comprising an angled rail that extends from a surface of the guide assembly up to a trough that is sized to engage a portion of a side edge of the second PCB pivotally moved into the trough; and
a PCB support attachable to a surface of the first PCB, the PCB support comprising a cleft sized to support a bottom edge of the second PCB.

15. The system of claim 14, wherein the trough is sized to engage only a portion of the side edge of the second PCB near a corner of the second PCB that comprises an intersection of the side edge and a top edge of the second PCB.

16. The system of claim 14, wherein the angled rail comprises a first angled rail, and the guide assembly further comprises a second angled rail that extends from the surface of the guide assembly up to the trough in parallel with the first angled rail.

17. The system of claim 14, wherein the guide assembly further comprises a stop formed on the surface of the guide assembly and positioned to support a surface of the second PCB engaged in the trough.

18. The system of claim 17, wherein the trough comprises a first trough and the angled rail comprises a first angled rail, the guide assembly further comprising:
a second trough that is sized to engage a portion of a side edge of a third PCB; and
a second angled rail that extends from the surface of the guide up to the second trough.

19. The system of claim 17, wherein the stop is positioned to support the surface of the second PCB and a surface of the third PCB.

20. The system of claim 14, wherein the trough substantially secures, at least in part, the second PCB against rotational movement.

21. The system of claim 14, wherein the PCB support further comprises
a protrusion that couples to the surface of the first PCB.

22. The system of claim 21, wherein the protrusion comprises a split stud that snaps into an aperture through the surface of the first PCB.

23. The system of claim 22, wherein the split stud comprises a detent that at least partially engages an underside of the first PCB.

24. The system of claim 23, wherein the second PCB is pivotally insertable into the cleft.

25. The system of claim 21, wherein the PCB support further comprises a sloped surface rising from a side of the cleft, the sloped surface comprising a support surface for the second PCB during insertion of the bottom edge of the second PCB into the cleft.

26. The system of claim 21, wherein the PCB support further comprises sloped surfaces rising from sides of the cleft, the sloped surfaces comprising support surfaces for the second PCB during insertion of the bottom edge of the second PCB into the cleft.

27. A printed circuit board (PCB) support system, comprising:
a guide attachable to a housing of a computing assembly that comprises a motherboard and a daughterboard, the guide comprising a locking assembly that comprises a notch and a surface angled toward the notch and is biased to snap over a portion of a side edge of the daughterboard received into the notch, the locking assembly further comprising a first rib coupled to the surface angled towards the notch from a side edge of the guide and a second rib coupled to the surface angled towards the notch from a side edge of the guide in parallel with the first rib; and
a PCB support attachable to a surface of the motherboard, the PCB support comprising a cleft sized to support a bottom edge of the daughterboard.

28. A printed circuit board (PCB) support system, comprising:
a guide attachable to a housing of a computing assembly that comprises a motherboard, a first daughterboard and a second daughterboard, the guide comprising:
a first locking assembly that comprises a first notch and a surface angled toward the first notch and is biased to snap over a portion of a side edge of the first daughterboard received into the first notch, the first locking assembly further comprising a first rib coupled to the surface angled towards the first notch from a first side edge of the guide; and a second locking assembly that comprises a second notch and a surface angled toward the second notch and is biased to snap over a portion of a side edge of the second daughterboard received into the second notch, the second locking assembly further comprising a second rib coupled to the surface angled towards the second notch from a second side edge of the guide; and a PCB support attachable to a surface of the motherboard, the PCB support comprising a cleft sized to support a bottom edge of the first or second daughterboard.

29. A system, comprising:

a computing assembly comprising an enclosure and a PCB assembly at least partially enclosed in the enclosure, the PCB assembly comprising a first PCB and a second PCB;

a PCB support assembly, comprising:

a guide assembly attachable to a rail of the enclosure, the guide assembly comprising an angled rail that extends from a surface of the guide assembly up to a trough that is sized to engage a portion of a side edge of the second PCB; and a support attachable to a surface of the first PCB, the PCB support comprising a cleft sized to support a bottom edge of the second PCB, wherein the angled rail comprises a first angled rail, and the guide assembly further comprises a second angled rail that extends from the surface of the guide assembly up to the trough in parallel with the first angled rail.

30. A system, comprising:

a computing assembly comprising an enclosure and a PCB assembly at least partially enclosed in the enclosure, the PCB assembly comprising a first PCB and a second PCB;

a PCB support assembly, comprising:

a guide assembly attachable to a rail of the enclosure, the guide assembly comprising an angled rail that extends from a surface of the guide assembly up to a trough that is sized to engage a portion of a side edge of the second PCB; and a support attachable to a surface of the first PCB, the PCB support comprising a cleft sized to support a bottom edge of the second PCB, wherein the guide assembly further comprises a stop formed on the surface of the guide assembly and positioned to support a surface of the second PCB engaged in the trough.

\* \* \* \* \*